United States Patent

[11] 3,626,214

[72] Inventor Charles R. Wesner
Crozet, Va.
[21] Appl. No. 16,118
[22] Filed Mar. 3, 1970
[45] Patented Dec. 7, 1971
[73] Assignee Sperry Rand Corporation
Great Neck, N.Y.

[54] BIPOLAR INPUT BISTABLE OUTPUT TRIGGER CIRCUIT
5 Claims, 1 Drawing Fig.

[52] U.S. Cl. .......... 307/290, 307/235, 307/237, 330/30 D
[51] Int. Cl. .......... H03k 3/15
[50] Field of Search .......... 307/235, 237, 290; 330/30 D, 69

[56] References Cited

UNITED STATES PATENTS

| | | | |
|---|---|---|---|
| 3,517,215 | 6/1970 | Richer | 307/235 |
| 3,538,347 | 11/1970 | Spotts | 307/237 |
| 2,985,836 | 5/1961 | Hatton | 307/237 X |
| 3,054,068 | 9/1962 | De Jong | 307/321 |
| 3,299,287 | 1/1967 | Staeudle | 330/69 X |
| 3,398,373 | 8/1968 | Caswell | 307/237 X |

*Primary Examiner*—Donald D. Forrer
*Assistant Examiner*—R. C. Woodbridge
*Attorney*—S. C. Yeaton

ABSTRACT: A bistable trigger circuit responsive to bipolar input signals having a bias network coupled to the inputs of a basic operational amplifier for providing bistable output signals. The biasing network includes a single variable resistor which provides adjustment of the bistable trigger reference voltage. The output of the operational amplifier changes state for positive or negative variations of the bipolar input signal, greater or less than the preset value of the variable reference voltage.

PATENTED DEC 7 1971 3,626,214
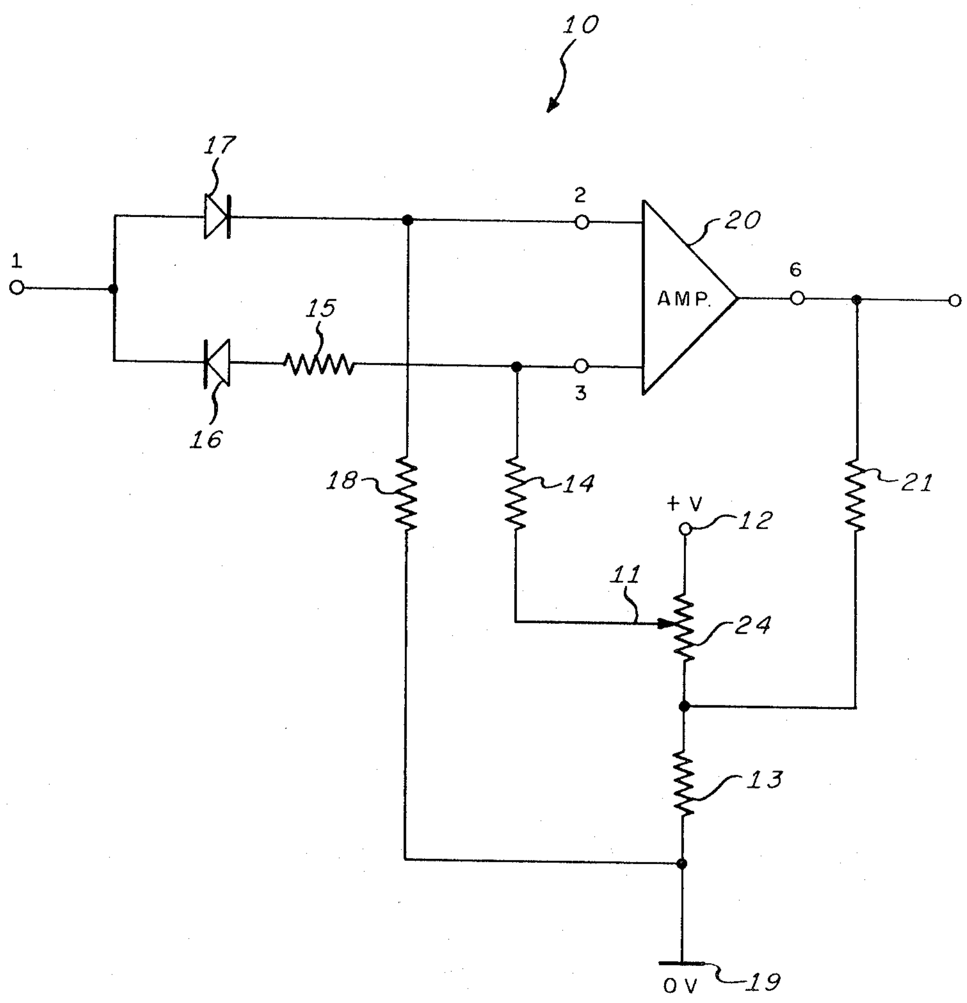
INVENTOR
CHARLES R. WESNER
BY
H P Terry
ATTORNEY

BIPOLAR INPUT BISTABLE OUTPUT TRIGGER CIRCUIT

BACKGROUND OF THE INVENTION

1. Field of the Invention

The present invention pertains to electronic bistable circuits, specifically bistable trigger circuits. Bistable trigger circuits are binary devices having an output which can assume one of two stable states. When the input is less than a selected reference voltage, the output will assume the first of its stable states. Increasing the input to a level greater than the selected reference voltage will force the output to assume the second stable state. Because of hysteresis in the circuit, the input level required to force the output to resume its first state is lower than the input level required to force the output to assume its second state.

2. Description of the Prior Art

In the prior art, bistable trigger circuits have been predominately unipolar devices. Applications requiring bipolar capability have employed two bistable trigger circuits connected in parallel each having its own associated reference level. A separate adjustable reference level has been used for each polarity even where these levels were of equal magnitude. This redundancy of components and adjustments is expensive and inefficient. Other prior art devices use sensing circuits which determine the polarity of the input signal and if it is not the proper polarity, an inverter circuit reverses the polarity prior to being applied to the input of the bistable trigger circuit.

The present invention uses a single operational amplifier, a single adjustment and a minimum of components in a bistable trigger circuit that will change its output state when the applied signal is greater or less than a selected reference voltage.

SUMMARY OF THE INVENTION

The present invention is a bistable trigger circuit which employs a single operational amplifier having an input bias network including series connected resistors and diodes coupled to an adjustable reference voltage. The output state of the bistable trigger circuit assumes its first stable state for all absolute values of an applied bipolar input signal equal to or less than a selected value for the reference voltage. When the absolute amplitude of the applied bipolar input signal exceeds the selected reference voltage, the bistable trigger circuit output is forced to its second stable state. Only one adjustment is required to vary the reference voltage level for the bipolar input signal.

BRIEF DESCRIPTION OF THE DRAWING

The single FIGURE is a schematic diagram of a bipolar bistable trigger circuit incorporating the present invention.

DESCRIPTION OF THE PREFERRED EMBODIMENT

The invention will be described in reference to the bistable trigger circuit 10 of the drawing. A potentiometer 24 is connected between a supply voltage 12 and one terminal of a first feedback resistor 13. The other terminal of feedback resistor 13 is connected to signal common 19 which is at a potential of zero volts. Series bias resistors 14 and 15 are connected between the wiper arm 11 of potentiometer 24 and the anode of diode 16. Input terminal 1 is connected to the junction of series connected bias diodes 16 and 17. Bias resistor 18 is connected between the cathode of diode 17 and signal common 19. A conventional operational amplifier 20 has a first input terminal 2 connected to the junction of the cathode of diode 17 and bias resistor 18 and its second input terminal 3 connected to the junction of series resistors 14 and 15. The output terminal 6 of the operational amplifier 20 is connected to one terminal of a second feedback resistor 21. The other terminal of resistor 21 is connected to the common terminals of potentiometer 24 and first feedback resistor 13.

A positive reference voltage is established by adjusting the position of wiper arm 11 on potentiometer 24. When there is no input signal present at input terminal 1, current will flow from the reference voltage at wiper arm 11, through series resistors 14 and 15, series diodes 16, and to signal common through a signal source applied to the input terminal 1. Since no current flows through bias resistor 18, the input terminal 2 of the operational amplifier 20 will be at a potential of zero volts. The voltage on the input terminal 3 will be more positive than the voltage on the input terminal 2 forcing the output terminal 6 to a positive value. The output terminal 6 will remain a positive value for all positive or negative voltage signals applied to input terminal 1 having an absolute value equal to or less than the reference voltage at the wiper arm 11.

Applying a positive voltage signal to input terminal 1 having a magnitude greater than that of the reference voltage at wiper arm 11 will reverse-bias diode 16 and inhibit current flow in diode 16 and resistor 15. Input terminal 3 will assume the voltage level of the reference voltage at wiper arm 11 and input terminal 2 will assume a positive voltage level slightly less than the signal present at input terminal 1 due to the voltage decrease across diode 17. The input terminal 2 will now be more positive than input terminal 3 and the output terminal 6 will change its state to a negative value.

Feedback resistors 13 and 21 form a voltage divider that applies a percentage of the negative voltage output on terminal 6 to potentiometer 24 which reduces the reference voltage at wiper arm 11 and input terminal 3. Therefore, the positive signal applied to input terminal 1 will have to be decreased to a level below that which triggered the change of state of the bistable trigger circuit 10 in order to effect a return to its initial state. The magnitude of this hysteresis is determined by the resistance values of resistors 13 and 21.

With the bistable trigger circuit 10 in its initial state, a negative voltage signal applied to input terminal 1 having an absolute value greater than that of the reference voltage at wiper arm 11 will reverse-bias diode 17 and inhibit current flow in diode 17 and resistor 18. Input terminal 2 will assume the voltage level of signal common 19 and input terminal 3 will assume a negative voltage level determined by diode 16 and resistors 14 and 15. The input terminal 2 will be more positive than input terminal 3 and the output terminal 6 will change its state to a negative value.

Feedback resistors 13 and 21 apply a percentage of the negative voltage output on terminal 6 to potentiometer 24 which reduces the reference voltage at wiper arm 11 and input terminal 3 becomes more negative. Therefore, a negative signal applied to input terminal 1 will have to be less negative than that which triggered the change of state of the bistable trigger circuit 10. The present invention thereby provides an economical bistable trigger circuit comprising a single operational amplifier which changes its output state whenever an applied bipolar input signal exceeds a reference voltage. Further, the reference voltage level for the bipolar input is controlled by a single adjustment.

While the invention has been described in its preferred embodiment, it is to be understood that the words which have been used are words of description rather than limitation and that any changes made within the purview of the appended claims may be made without departing from the true scope and spirit of the invention in its broader aspects.

I claim:

1. In bistable trigger circuit apparatus comprising, biasing means responsive to bipolar input signals and having first and second output terminals, variable reference level means coupled to said biasing means and having a single adjustment for providing a threshold level at the input terminal of said biasing means, bistable amplifier means having first and second input terminals connected to said first and second output terminals of said biasing means for providing a first output signal in response to absolute values of said bipolar input signals equal to or less than said threshold levels and providing a second output signal in response to absolute values of said bipolar input signals greater than said threshold levels, and feedback means coupled between said output terminal of said bistable amplifier means and the variable reference level means for returning a percentage of the output signal to the threshold level at said input terminal of said biasing means thereby providing hysteresis for the bistable trigger circuit.

2. In apparatus of the character recited in claim 1 in which said biasing means includes series connected resistors and semiconductor devices.

3. In apparatus of the character recited in claim 1 in which said bistable amplifier means includes an operational amplifier.

4. In apparatus of the character recited in claim 1 in which said variable reference level means includes a variable resistor coupled to a positive or negative voltage supply.

5. In apparatus of the character recited in claim 1 in which said feedback means includes a resistor divider network.

* * * * *